US012170991B2

(12) United States Patent
Liu et al.

(10) Patent No.: US 12,170,991 B2
(45) Date of Patent: Dec. 17, 2024

(54) SIDELINK CONTROL SIGNALING WITH TRANSMIT BEAM INDICATIONS

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/509,970

(22) Filed: Nov. 15, 2023

(65) Prior Publication Data
US 2024/0155594 A1 May 9, 2024

Related U.S. Application Data

(63) Continuation of application No. 17/445,279, filed on Aug. 17, 2021, now Pat. No. 11,864,170.

(60) Provisional application No. 63/072,588, filed on Aug. 31, 2020.

(51) Int. Cl.
H04W 72/044 (2023.01)
H04W 72/0453 (2023.01)
H04W 92/18 (2009.01)

(52) U.S. Cl.
CPC ..... *H04W 72/046* (2013.01); *H04W 72/0453* (2013.01); *H04W 92/18* (2013.01)

(58) Field of Classification Search
CPC ........... H04W 72/046; H04W 72/0453; H04W 92/18; H04W 16/28; H04W 72/04; H04W 72/20; H04W 76/12; H04B 7/0695; H04B 7/06; H04B 7/0617
See application file for complete search history.

(56) References Cited

U.S. PATENT DOCUMENTS

| 10,764,867 | B2 | 9/2020 | Chae et al. |
| 2017/0366328 | A1* | 12/2017 | Seo ........................ H04L 5/0051 |
| 2020/0053704 | A1* | 2/2020 | Kim ..................... H04W 74/006 |
| 2020/0304233 | A1* | 9/2020 | Garcia ................... H04B 7/088 |
| 2020/0374858 | A1* | 11/2020 | Vargas .................. H04W 72/20 |
| 2022/0070848 | A1 | 3/2022 | Liu et al. |
| 2022/0104178 | A1 | 3/2022 | Lee et al. |

(Continued)

FOREIGN PATENT DOCUMENTS

WO WO-2020060468 A1 * 3/2020 .......... H04W 72/042

OTHER PUBLICATIONS

Discussion on feasibility and benefits for mode 2 enhancement Aug. 17-28, 2020 (Year: 2020).*

(Continued)

*Primary Examiner* — Mewale A Ambaye
(74) *Attorney, Agent, or Firm* — Harrity & Harrity, LLP

(57) ABSTRACT

Various aspects of the present disclosure generally relate to wireless communication. In some aspects, a first UE may receive, from a second UE, resource reserving sidelink control information that indicates a transmit beam of the second UE and a sidelink resource of the second UE. The first UE may transmit data on the sidelink resource of the second UE using a transmit beam of the first UE that does not spatially overlap with the transmit beam of the second UE. Numerous other aspects are provided.

20 Claims, 14 Drawing Sheets

(56) References Cited

U.S. PATENT DOCUMENTS

2022/0150032 A1  5/2022  Lee et al.

OTHER PUBLICATIONS

International Preliminary Report On Patentability—PCT/US2021/071224—The International Bureau of WIPO—Geneva, Switzerland—Mar. 9, 2023.
International Search Report and Written Opinion—PCT/US2021/071224—ISA/EPO—Dec. 3, 2021.
LG Electronics: "Discussion on Feasibility and Benefits for Mode 2 Enhancement", 3GPP TSG RAN WG1 Meeting #102-e, R1-2005749, 3GPP, Mobile Competence Centre, France, vol. RAN WG1, No. e-Meeting, Aug. 17, 2020-Aug. 28, 2020, Aug. 8, 2020, XP051917712, 9 Pages, Section 1, p. 1 Section 2.1, p. 1-p. 2, Figure 1 p. 3, Figure 3, pp. 1 and 2, Sub-Section Extension of Resource Reservation 11 and p. 4, Sub-Sections, "Release of Reserved Resources" and "Recommendation of Transmission Characteristics During a Certain Time Duration".
Qualcomm Incorporated: "Reliability and Latency Enhancements for Mode 2", 3GPP Draft, R1-2006829, 3GPP TSG RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1. No. Aug. 17, 2020-Aug. 28, 2020, Aug. 8, 2020 (Aug. 8, 2020), XP051918279, 10 Pages, section 3, p. 3-p. 5, section 4, p. 5-p. 6, the Whole Document, sections 1, 3, Section 7.

* cited by examiner

SIDELINK CONTROL SIGNALING WITH TRANSMIT BEAM INDICATIONS

CROSS-REFERENCE TO RELATED APPLICATION

This application is a Continuation of U.S. patent application Ser. No. 17/445,279 filed Aug. 17, 2021 entitled "SIDELINK CONTROL SIGNALING WITH TRANSMIT BEAM INDICATIONS," which claims priority to Provisional Patent Application No. 63/072,588, filed on Aug. 31, 2020, entitled "SIDELINK CONTROL SIGNALING WITH TRANSMIT BEAM INDICATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink control signaling with transmit beam indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first UE includes: receiving, from a second UE, resource reserving sidelink control information (RR-SCI) that indicates a transmit beam of the second UE, and a sidelink resource of the second UE; and transmitting data on the sidelink resource of the second UE using a transmit beam of the first UE that does not spatially overlap with the transmit beam of the second UE.

In some aspects, a method of wireless communication performed by a first UE includes: receiving, from a second UE, an RR-SCI; and determining a sidelink resource of a third UE and a transmit beam of the third UE based at least in part on the relayed RR-SCI.

In some aspects, a first UE for wireless communication includes a memory and one or more processors, coupled to the memory, configured to: receive, from a second UE, an RR-SCI that indicates a transmit beam of the second UE, and a sidelink resource of the second UE; and transmit data on the sidelink resource of the second UE using a transmit beam of the first UE that does not spatially overlap with the transmit beam of the second UE.

In some aspects, a first UE for wireless communication includes a memory and one or more processors, coupled to the memory, configured to: receive, from a second UE, an RR-SCI; and determine a sidelink resource of a third UE and a transmit beam of the third UE based at least in part on the relayed RR-SCI.

In some aspects, a non-transitory computer-readable medium storing a set of instructions for wireless communication includes: one or more instructions that, when executed by one or more processors of a first UE, cause the first UE to: receive, from a second UE, an RR-SCI that indicates a transmit beam of the second UE, and a sidelink resource of the second UE; and transmit data on the sidelink resource of the second UE using a transmit beam of the first UE that does not spatially overlap with the transmit beam of the second UE.

In some aspects, a non-transitory computer-readable medium storing a set of instructions for wireless communication includes: one or more instructions that, when executed by one or more processors of a first UE, cause the first UE to: receive, from a second UE, an RR-SCI; and determine a sidelink resource of a third UE and a transmit beam of the third UE based at least in part on the relayed RR-SCI.

In some aspects, a first apparatus for wireless communication includes: means for receiving, from a second apparatus, an RR-SCI that indicates a transmit beam of the second apparatus, and a sidelink resource of the second apparatus; and means for transmitting data on the sidelink resource of the second apparatus using a transmit beam of the first apparatus that does not spatially overlap with the transmit beam of the second apparatus.

In some aspects, a first apparatus for wireless communication includes: means for receiving, from a second apparatus, an RR-SCI; and means for determining a sidelink resource of a third apparatus and a transmit beam of the third apparatus based at least in part on the relayed RR-SCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
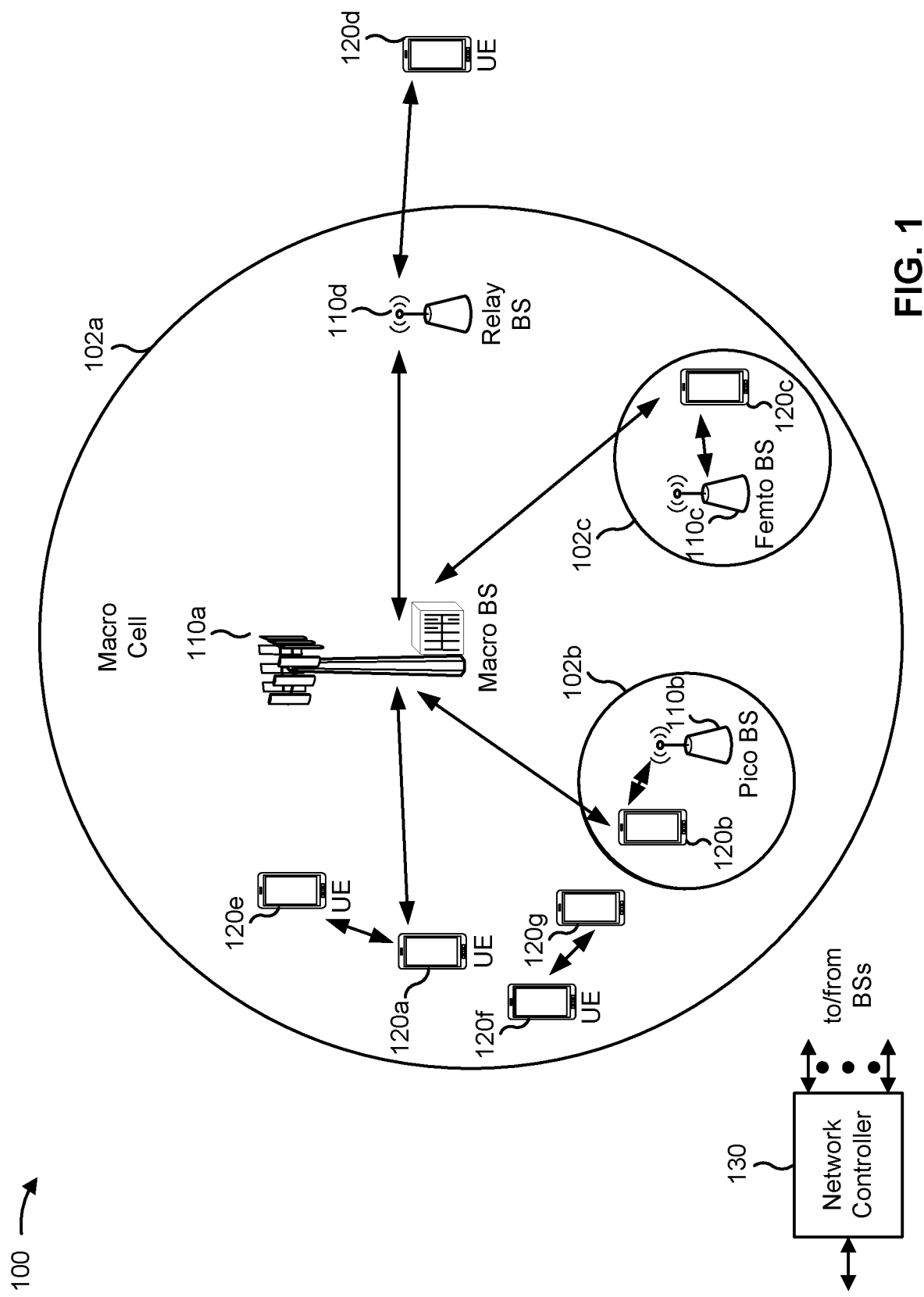
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
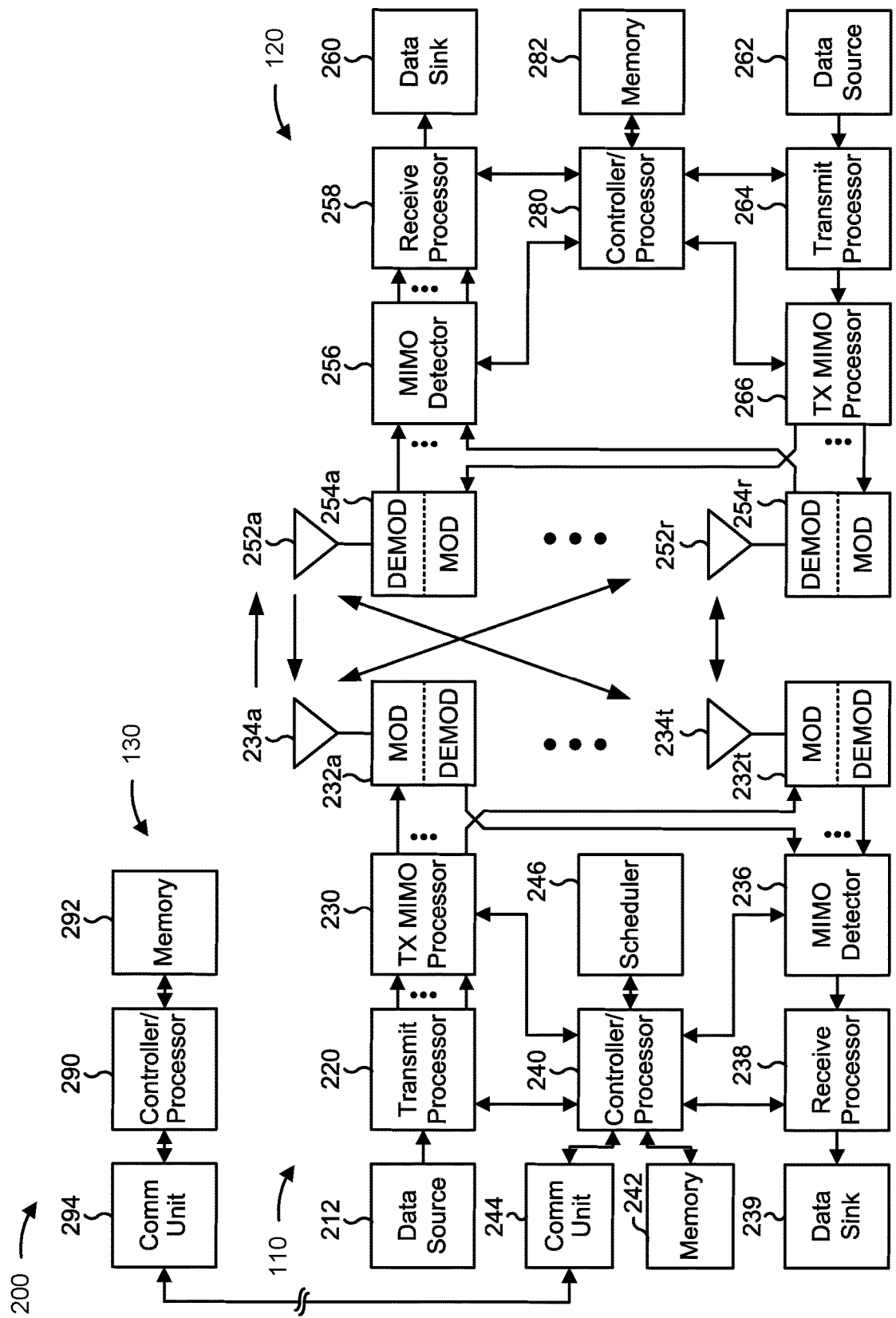
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the base station 110, the controller/processor 280 of the UE 120, and/or any other component(s) of FIG. 2 may perform one or more techniques associated with sidelink control signaling with transmit beam indications, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a UE (e.g., UE 120) may include means for receiving, from a second UE, resource reserving sidelink control information (RR-SCI) that indicates a transmit beam of the second UE and a sidelink resource of the second UE, and/or means for transmitting data on the sidelink resource of the second UE using a transmit beam of the first UE that does not spatially overlap with the transmit beam of the second UE. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a UE (e.g., UE 120) may include means for receiving, from a second UE, a relayed resource reserving sidelink control information (RR-SCI), and/or means for determining a sidelink resource of a third UE and a transmit beam of the third UE based at least in part on the relayed RR-SCI. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
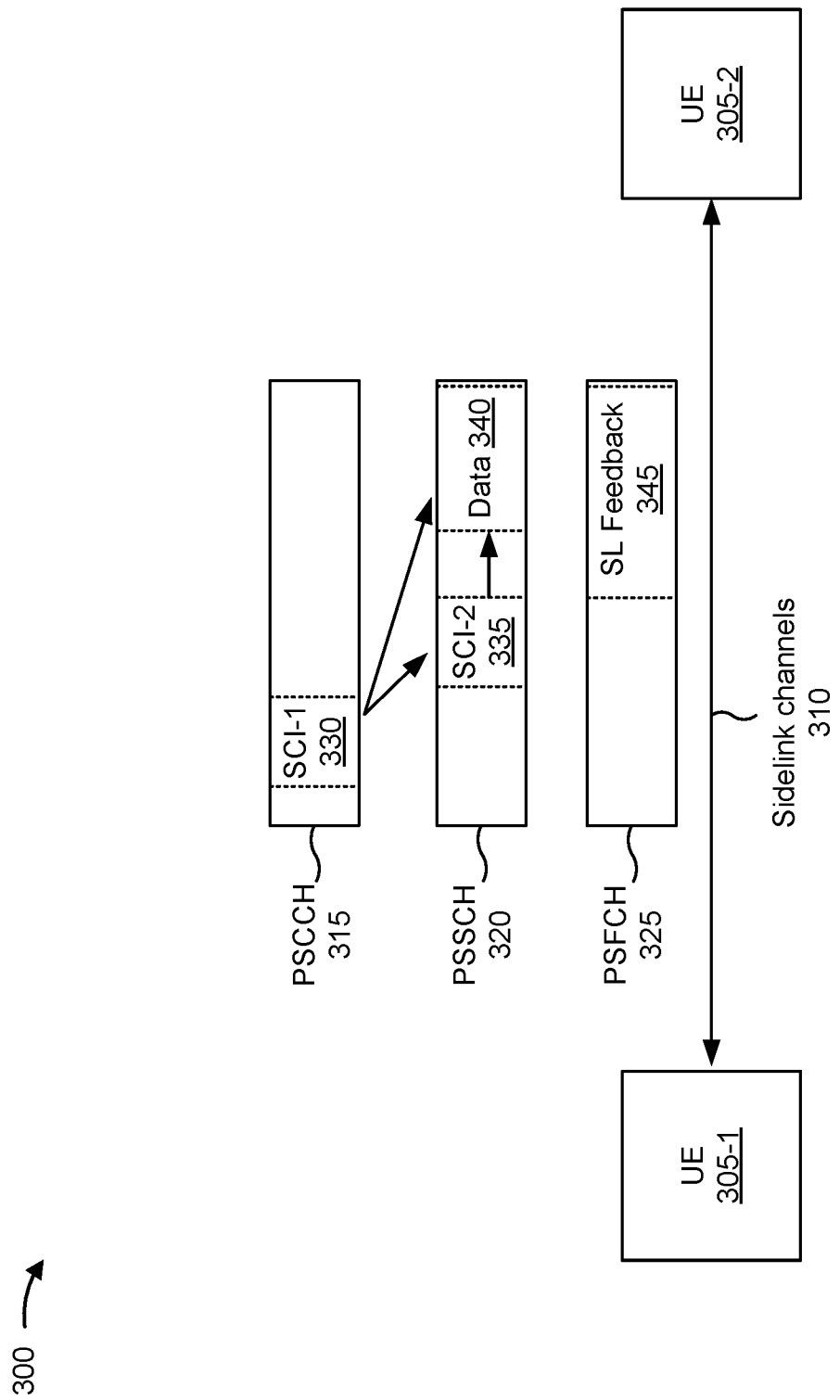
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-person (V2P) communications), and/or mesh networking. In some aspects, the UEs 305 (e.g., UE 305-1 and/or UE 305-2) may include one or more other UEs described elsewhere herein, such as UE 120. In some aspects, the one or more sidelink channels 310 may use a PC5 interface, may operate in a high frequency band (e.g., the 5.9 GHz band), and/or may operate on an unlicensed or shared frequency band (e.g., an NR unlicensed (NR-U) frequency band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

The PSCCH 315 may carry sidelink control information part 1 (SCI-1) 330, which may indicate various control information used for sidelink communications. The control information may include an indication of one or more resources (e.g., time resources, frequency resources, and/or spatial resources) where various types of information may be carried on the PSSCH 320, information for decoding sidelink communications on the PSSCH 320, a quality of service (QoS) priority value, a resource reservation period, a PSSCH demodulation reference signal (DMRS) pattern, an SCI format and a beta offset for sidelink control information part 2 (SCI-2) 335 transmitted on the PSSCH 320, a quantity of PSSCH DMRS ports, and/or a modulation coding scheme (MCS).

The information carried on the PSSCH 320 may include the SCI-2 335 and/or data 340. The SCI-2 335 may include various types of information, such as a hybrid automatic repeat request (HARQ) process ID, a new data indicator (NDI) associated with the data 340, a source identifier, a destination identifier, and/or a channel state information (CSI) report trigger. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

The PSFCH 325 may be used to communicate sidelink feedback 345, such as HARQ feedback (e.g., acknowledgement or negative acknowledgement (ACK/NACK) information), transmit power control (TPC), and/or a scheduling request (SR).

As indicated above, FIG. 3 is provided as an example. Other examples may differ from what is described with respect to FIG. 3.

Figure 4:
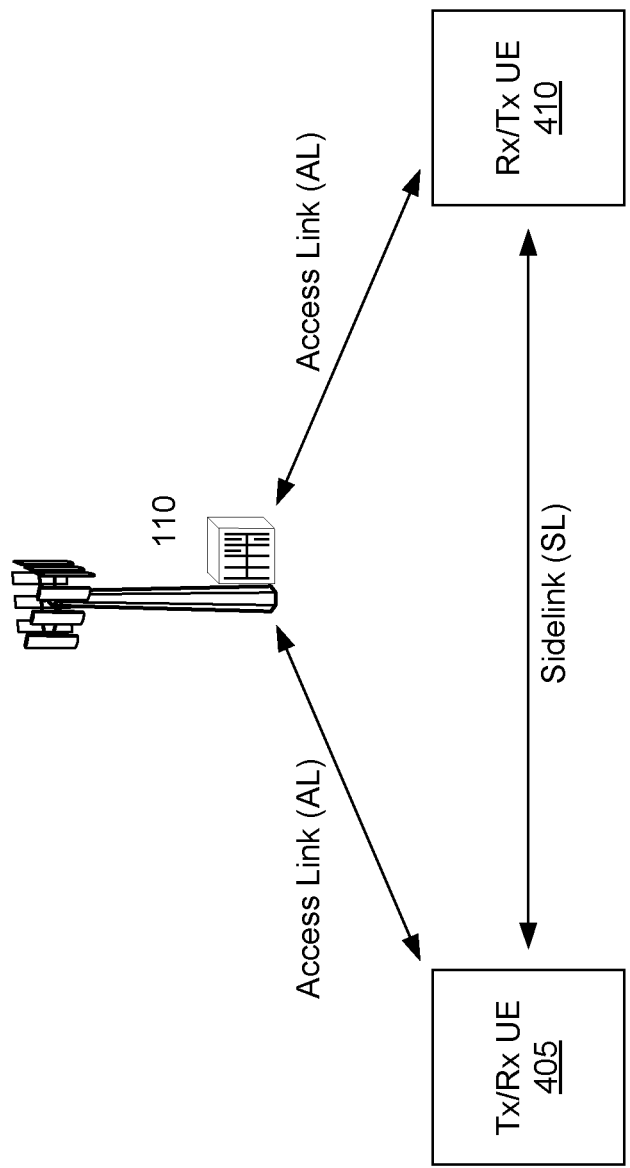
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

A Tx UE may transmit SCI-1 in a PSCCH to indicate a resource reservation for sidelink communications. The resource reservation may be transmitted to reserve resources for up to three retransmissions in a periodic pattern. For example, the SCI-1 may be configured using radio resource control (RRC) signaling to reserve up to one or two additional slots within a 32-slot duration of a first transmission from the Tx UE. The resource reservation included in the SCI-1 may be for retransmission of a current transport block (TB). When a current TB is successfully decoded, a resource reserved by the resource reservation may be released (e.g., the resource may be released from an upper layer), and a new random resource may be selected for transmitting other TBs by the Tx UE. The resource reservation (which has not been used since the current TB was successfully decoded) may not be reused for transmitting a new TB by the Tx UE.

The Tx UE may transmit the SCI-1 to reserve resources for retransmissions in a periodic manner. The SCI-1 may include a periodic value. For example, the periodic value may range from 1-99 slots, or the periodic value may be 100, 200, . . . , 1000, where 0 indicates no periodic reservation. The resource reservation may be periodic to handle a reservation for a next instance of a periodic traffic pattern.

A UE (e.g., a Tx UE) may be triggered to report available or reserved resources via upper layer signaling. The report may be formed based at least in part on historic SCI-1 monitoring, which may take into consideration the resources reserved, a priority of a monitored SCI-1, and the like.

For a monitored SCI-1, a UE may reserve resources for a current transmission and up to two subsequent transmissions (e.g., a total of up to three transmissions). Additionally, the UE may reserve resources for up to three resources in a next instance of an indicated period (e.g., when a non-zero period is indicated).

When a UE cannot monitor the SCI-1 due to a half-duplex restriction at the UE, the UE may assume an SCI-1 is transmitted in a slot. The UE may assume that the SCI-1 is transmitted in the slot, even when the UE cannot detect the SCI-1 due to the half-duplex restriction. In this case, the UE may block slot(s) that are possibly indicated in the SCI-1. Additionally, the UE may block the slot(s) for periods that were possibly configured by the SCI-1 (e.g., up to 15 slots).

A synchronization signal block (SSB) or PSSCH based beam sweeping waveform and procedure may be used to train an Tx/Rx beam for a Tx/Rx node. For example, the Tx/Rx UE may keep track of the Tx/Rx beam based at least in part on a beam sweeping sidelink SSB (S-SSB) or a beam sweeping PSSCH transmitted periodically to the Tx/Rx UE. The beam sweeping PSSCH may be transmitted to the Tx/Rx UE for Tx/Rx beam selection prior to data transmission.

The Tx UE may perform a data transmission via a narrow beam after the Tx/Rx beam is established for the Tx UE. An omni-directional resource reserving (RR) SCI-1 to reserve resources for the data transmission may prevent other Tx/Rx UE pairs from using reserved resources associated with the RR SCI-1. When operating in a high band, the omni-directional RR SCI-1 may not achieve a same coverage as a beamformed PSSCH. Thus, the omni-directional RR SCI-1 may not be detected by other Tx UEs, which may potentially cause interference at the reserved resources between Tx UEs.

Figure 5:
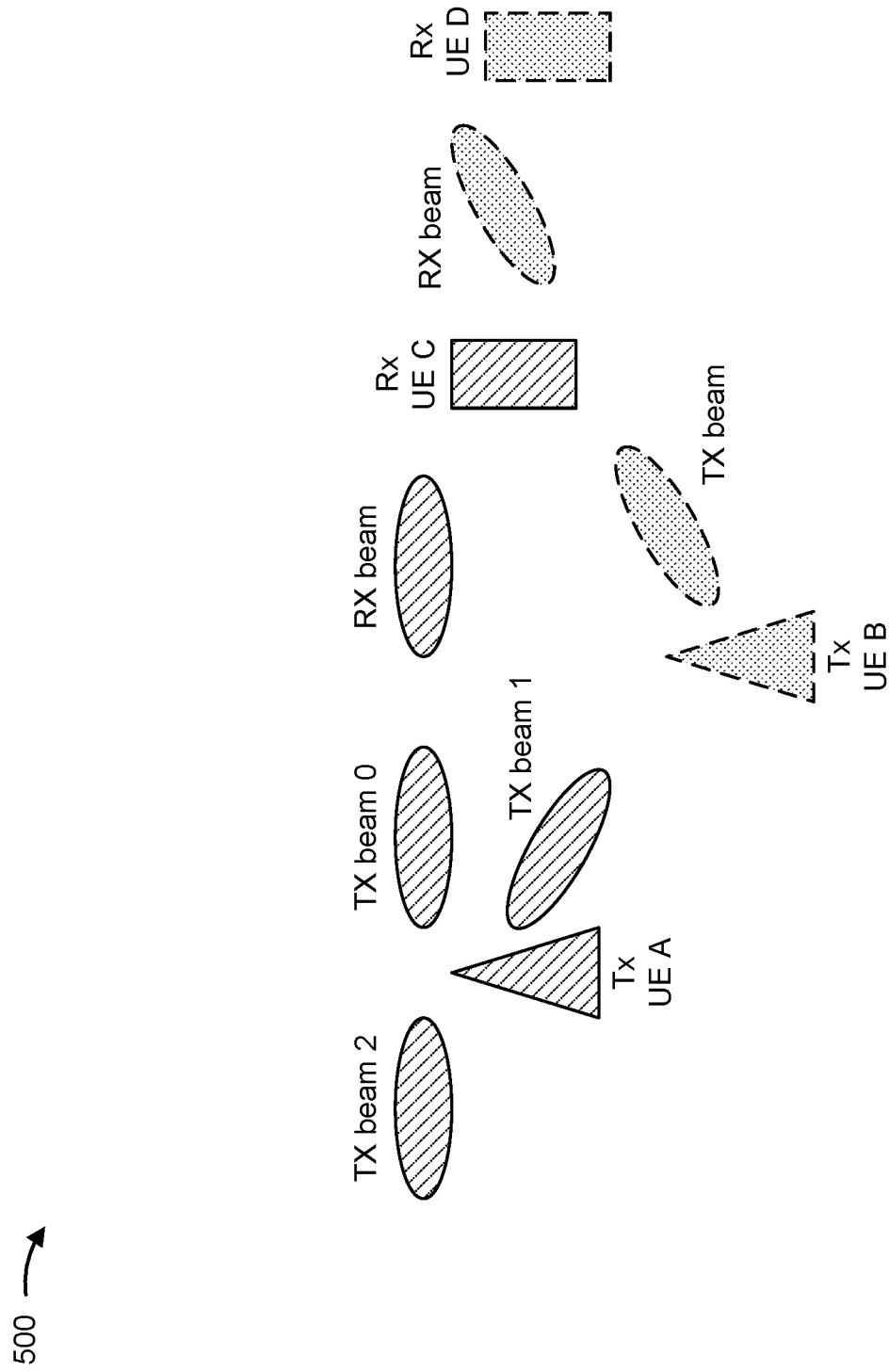
FIG. 5 is a diagram illustrating an example of sidelink communications between a plurality of nodes, in accordance with the present disclosure.

FIG. 5 is a diagram illustrating an example 500 of sidelink communications between a plurality of nodes, in accordance with the present disclosure.

As shown in FIG. 5, a Tx UE A (e.g., a Tx Node A) may transmit a data packet to an Rx UE C (e.g., an Rx Node C) using a first Tx beam (Tx beam 0). The Rx UE C may receive the data packet using an Rx beam. The Tx UE A may also transmit data packets using a second Tx beam (Tx beam 1) and a third Tx beam (Tx beam 2). Further, a Tx UE B (e.g., a Tx Node B) may transmit a data packet to an Rx UE D (e.g., an Rx Node D) using a Tx beam, and the Rx UE D may receive the data packet using an Rx beam. The data packets transmitted by the Tx UE A and the Tx UE B may be directional sidelink transmissions. The Tx beams may be associated with the Tx UEs, and the Rx beams may be associated with the Rx UEs.

Tx UE A may transmit the data packet to Rx UE C and reserve an upcoming sidelink resource using an omni-directional RR SCI-1. In a legacy system, Tx UE B may receive the omni-directional RR SCI-1 from Tx UE A. Tx UE B may be unable to transmit data packets to Rx UE D on reserved sidelink resources indicated by the omni-directional RR SCI-1 received from Tx UE A. Tx UE B may be unable to transmit the data packets on the reserved sidelink resources, even though the data packets transmitted from Tx UE B may not interfere with data packet transmissions between Tx UE A and Rx UE C. The data packets transmitted by Tx UE B may not interfere with the data packets transmitted by Tx UE A due to spatial division multiplexing (SDM). With SDM, Tx UE B may safely transmit on a reserved sidelink resource associated with Tx UE A, and vice versa, without causing an interference at the reserved sidelink resource.

However, in the legacy system, Tx UE B cannot determine that sidelink resources reserved by Tx UE A are associated with a Tx beam that does not coincide with a Tx beam of Tx UE B. In other words, Tx UE B cannot determine that different Tx beams are used at Tx UE B and Tx UE A, respectively, and as a result, directional sidelink transmissions from Tx UE B do not conflict with directional sidelink transmissions from Tx UE A.

As indicated above, FIG. 5 is provided as an example. Other examples may differ from what is described with respect to FIG. 5.

In various aspects of techniques and apparatuses described herein, a first UE may receive, from a second UE, an RR-SCI that indicates a Tx beam of the second UE and a sidelink resource of the second UE. The first UE may transmit data on the sidelink resource of the second UE using a Tx beam of the first UE when the Tx beam of the first UE does not spatially overlap with the Tx beam of the second UE. In other words, the first UE may determine that the second UE is using a different Tx beam as compared to the first UE based at least in part on the Tx beam of the second UE indicated in the RR-SCI. When the Tx beams between the first UE and the second UE are different, the first UE may transmit on a same sidelink resource that is reserved by the second UE. As a result, the first UE may not unnecessarily avoid using sidelink resources that are reserved by the second UE, but do not cause a conflict with the first UE due to different Tx beams being used by the first UE and the second UE.

Figure 6:
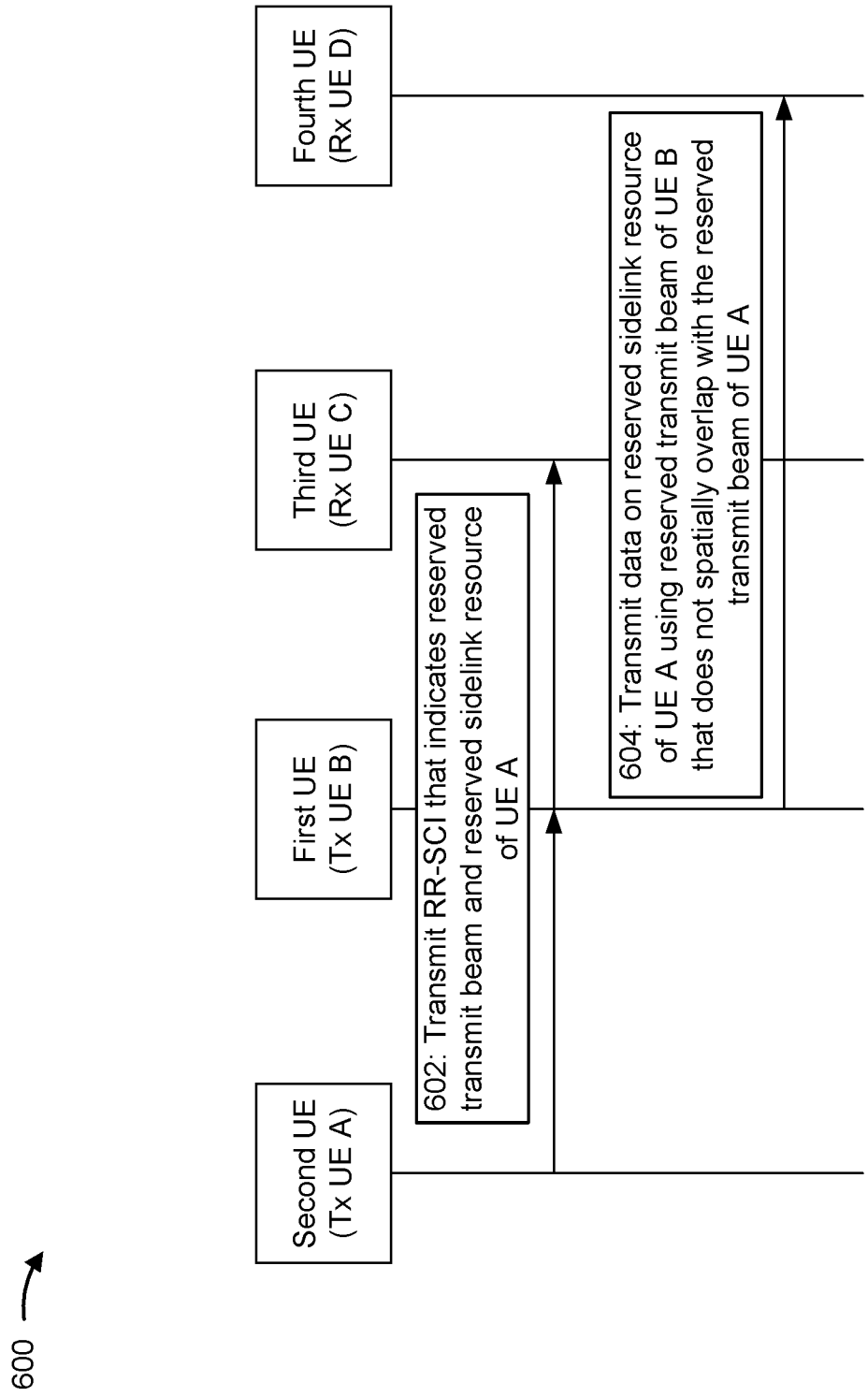
FIGS. 6-12 are diagrams illustrating examples associated with sidelink control signaling with transmit beam indications, in accordance with the present disclosure.

FIG. 6 is a diagram illustrating an example 600 of sidelink control signaling with Tx beam indications, in accordance with the present disclosure. As shown in FIG. 6, example 600 includes communication between a first UE (e.g., UE 120a), a second UE (e.g., UE 120e), a third UE (e.g., UE 120f), and a fourth UE (e.g., UE 120g). In some aspects, the first UE and the second UE may be included in a wireless network such as wireless network 100. The first UE and the second UE may communicate on a wireless sidelink.

As shown by reference number 602, the second UE (Tx UE A) may transmit an RR-SCI. The RR-SCI may be received at the third UE (Rx UE C). The RR-SCI may also be received at the first UE (Tx UE B). The RR-SCI can indicate a Tx beam of the second UE (e.g., a reserved Tx beam of the second UE). The RR-SCI can indicate an identifier (e.g., a Tx UE ID) associated with the second UE. The RR-SCI can include a sidelink resource of the second UE (e.g., a reserved sidelink resource of the second UE). The Tx beam indicated in the RR-SCI may be different than a beam transmitting the RR-SCI.

In some aspects, the first UE may receive a periodic S-SSB from the second UE. The periodic S-SSB may indicate the identifier associated with the second UE. The first UE may later receive the RR-SCI from the second UE based at least in part on the periodic S-SSB received from the second UE.

In some aspects, the first UE may perform a sweep of a PSSCH. The first UE may determine the identifier associated with the second UE based at least in part on the sweep of the PSSCH. The first UE may later receive the RR-SCI from the second UE based at least in part on the sweep of the PSSCH.

As shown by reference number 604, the first UE may transmit data on the sidelink resource of the second UE using a Tx beam of the first UE that does not spatially overlap with the Tx beam of the second UE. The first UE may transmit the data to the fourth UE (Rx UE D). Before transmitting the data, the first UE may determine that the Tx beam of the second UE does not conflict (e.g., spatially overlap) with the Tx beam of the first UE. The first UE may determine the Tx beam of the second UE based at least in part on the RR-SCI received from the second UE. The first UE may transmit the data on the sidelink resource of the second UE after determining that the Tx beams of the first UE and the second UE do not spatially overlap.

In some aspects, a Tx beam associated with a Tx UE (e.g., Tx UE A) may be used by the Tx UE on a sidelink resource, and other Tx UEs (e.g., Tx UE B) may use other Tx beams on the same sidelink resource. Due to SDM, multiple transmissions by multiple Tx UEs on the same sidelink resource may not cause a collision when the multiple Tx UEs each use different Tx beams.

In some aspects, multiple Tx-Rx UE pairs (e.g., a first pair of Tx UE A and Rx UE C, and a second pair of Tx UE B and Rx UE D) may be spatially division multiplexed on same sidelink resources. In order for the multiple Tx-Rx UE pairs to be spatially division multiplexed on the same sidelink resources, a PSCCH on following sidelink resources (except an initial PSCCH that carries directional RR-SCI) may be transmitted using a narrow beam.

As indicated above, FIG. 6 is provided as an example. Other examples may differ from what is described with respect to FIG. 6.

Figure 7:
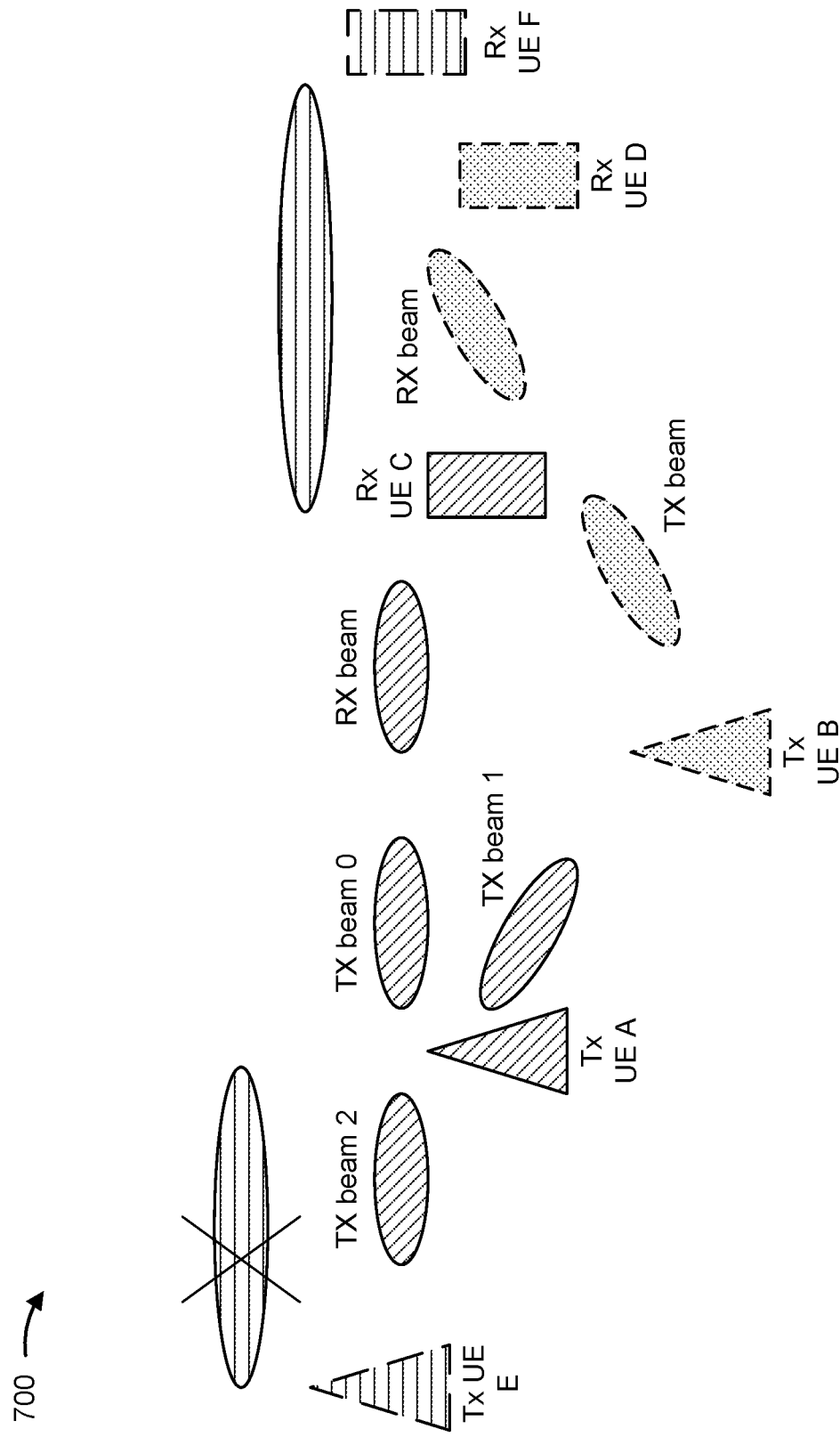

FIG. 7 is a diagram illustrating an example 700 of sidelink control signaling with Tx beam indications, in accordance with the present disclosure.

As shown in FIG. 7, Tx UE A (the second UE in FIG. 6) may communicate with Rx UE C (the third UE in FIG. 6). Tx UE B (the first UE in FIG. 6) may communicate with Rx UE D (the fourth UE in FIG. 6). Tx UE A may be configured to use a first Tx beam (Tx beam 0), a second Tx beam (Tx beam 1), and a third Tx beam (Tx beam 2). The first Tx beam and the second Tx beam may be associated with a first direction, and the third Tx beam may be associated with a second direction that is opposite to the first direction. Rx UE C may be configured to use an Rx beam. Tx UE B may be configured to use a Tx beam, and Rx UE D may be configured to use an Rx beam. Additionally, in this example, Tx UE E may communicate with Rx UE F.

As an example, Tx UE A may transmit an RR-SCI to Rx UE C. The RR-SCI transmitted from Tx UE A to Rx UE C may include the first Tx beam associated with Tx UE A. Tx UE B may receive and decode the RR-SCI transmitted from Tx UE A. Although the RR-SCI may be transmitted from Tx UE A to Rx UE C, the RR-SCI may be omni-directional, so the RR-SCI may be received and decoded at Tx UE B. Tx UE B may receive the RR-SCI and identify, based at least in part on the RR-SCI, the first Tx beam associated with Tx UE A and a sidelink resource associated with Tx UE A. Tx UE B may determine that a Tx beam associated with Tx UE B is different than the first Tx beam associated with Tx UE A. Tx UE B may transmit data on the sidelink resource associated with Tx UE A when the Tx beam associated with Tx UE B is different than the first Tx beam associated with Tx UE A.

In some aspects, Tx UE B may receive the RR-SCI from Tx UE A, and Tx UE B may determine the sidelink resource of Tx UE A but not the Tx beam of Tx UE A. In this case, Tx UE B may assume that the sidelink resource of Tx UE A cannot be used by Tx UE B.

In some aspects, the RR-SCI may include the Tx beam and/or an opposite-direction Tx beam. For example, the RR-SCI transmitted from Tx UE A to Rx UE C may include the third Tx beam associated with Tx UE A. The third Tx beam may be in an opposite direction as compared to the first Tx beam associated with Tx UE A. In other words, the third Tx beam may be associated with a first direction and the first Tx beam may be associated with a second direction that is opposite to the first direction. The RR-SCI may include the third Tx beam associated with Tx UE A to prevent, for example, a data transmission between Tx UE E and Rx UE F from interfering with a data reception at Rx UE C.

In some aspects, for a cross beam reservation, an SCI-1 in a PSCCH may also be beamformed. A Tx UE (e.g., Tx UE A, Tx UE B, or Tx UE E) may reserve different beams for later data transmissions and/or retransmissions. An RR-SCI may reserve resources associated with the different beams for a current PSSCH and/or a future PSSCH.

As indicated above, FIG. 7 is provided as an example. Other examples may differ from what is described with respect to FIG. 7.

Figure 8:
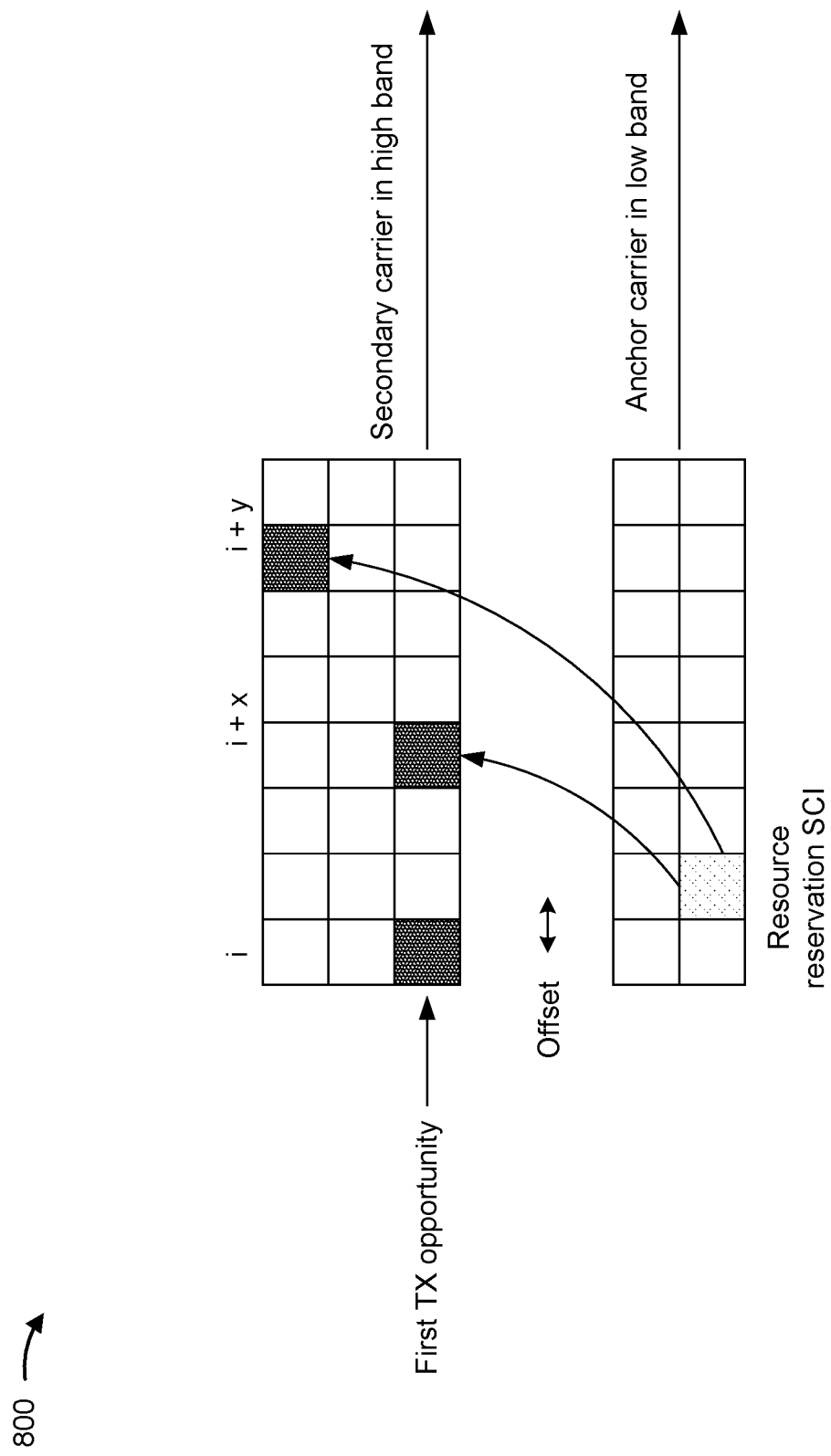

FIG. 8 is a diagram illustrating an example 800 of sidelink control signaling with Tx beam indications, in accordance with the present disclosure.

In some aspects, an omni-directional RR-SCI in a high band may not match a coverage level of a beamformed data channel. However, the RR-SCI may be expected to be detected by a plurality of sidelink UEs. In order to improve the coverage level of the RR-SCI, a low band (e.g., 6 GHz) may be used to transmit the RR-SCI for sidelink and NR-U sidelink. The low band may be paired with an unlicensed high band with carrier aggregation. The low band may be used for control signaling (e.g., for transmitting the RR-SCI), as the low band may have increased coverage areas as compared to the high band. The high band may employ carrier(s) for high data throughput.

As shown in FIG. 8, a first transmit opportunity may occur at a sidelink resource associated with a secondary carrier in the high band. A TX UE (e.g., Tx UE A of FIG. 7 and/or Tx UE B of FIG. 7) may transmit an RR-SCI on a sidelink resource associated with an anchor carrier in the low band. The anchor carrier may be a first carrier in the low band, and the secondary carrier may be a second carrier in the high band. The first transmit opportunity and the RR-SCI transmission may be separated by an offset. The RR-SCI transmitted on the sidelink resource associated with the anchor carrier in the low band may be a cross-carrier reservation. The cross-carrier reservation may indicate one or more sidelink resources associated with the secondary carrier in the high band. For example, the RR-SCI may include a cross-carrier reservation that indicates two separate sidelink resources associated with the secondary carrier in the high band. The one or more sidelink resources indicated by the RR-SCI with the cross-carrier reservation may occur later in time as compared to a sidelink resource used to transmit the RR-SCI with the cross-carrier reservation.

In some aspects, the RR-SCI including the cross-carrier reservation may indicate upcoming sidelink resource reservations in another carrier (e.g., a carrier other than a carrier in which the RR-SCI is transmitted). For example, the RR-SCI may be transmitted in an anchor channel associated with the low band, and the RR-SCI may serve to reserve upcoming sidelink resources of the secondary carrier associated with the high band. Other UEs (e.g., the Tx UEs and Rx UEs of FIG. 7) may monitor the anchor channel associated with the low band to detect RR-SCIs with cross-carrier reservations.

In some aspects, the RR-SCI with the cross-carrier reservation may be transmitted in the anchor channel associated with the low band. The RR-SCI may include an SCI-1 carrying a reservation periodicity. The RR-SCI may include an SCI-2 with the cross carrier resource reservation. The SCI-2 may be transmitted in a shortened PSSCH when no data is transmitted along with the SCI-2.

The RR-SCI with the cross-carrier reservation may include, in SCI-1 and/or SCI-2, a reserved Tx beam index (or reserved Tx beam indices) for the secondary carrier associated with the high band. The RR-SCI with the cross-carrier reservation may include, in SCI-1 and/or SCI-2, a carrier index of the secondary carrier associated with the high band. The carrier index of the secondary carrier may be included when there are multiple secondary carriers available. The RR-SCI with the cross-carrier reservation may include, in SCI-1 and/or SCI-2, a slot offset between the RR-SCI and a first transmission in the secondary carrier associated with the high band. The slot offset may be associated with a secondary carrier numerology.

In some aspects, the RR-SCI with the cross-carrier reservation transmitted in the anchor carrier associated with the low band may not be aligned with a first transmission in the secondary carrier associated with the high band due to a scheduling constraint. For example, the scheduling constraint may be due to sensing performed in the anchor carrier associated with the low band.

As indicated above, FIG. 8 is provided as an example. Other examples may differ from what is described with respect to FIG. 8.

In some cases, a plurality of Tx UEs and Rx UEs may be configured using a star topology. An Rx UE may establish an Rx beam directed towards a corresponding Tx UE. The Tx UE may be an anchor UE configured to use a Tx beam that is directed towards the corresponding Rx UE. The Tx and Rx beams may be configured for the Rx UE and the Tx UE during an initial beam selection process or a PSSCH beam sweeping procedure.

In some aspects, an RR-SCI may be transmitted using a wide beam. Data may be transmitted in accordance with a resource reservation indicated by the RR-SCI, and the data may be transmitted using a narrow beam. A transmission of the RR-SCI and a transmission of the data based at least in part on the RR-SCI may be separated by an X symbol switching gap, wherein X is a positive integer.

In some cases, a first Tx UE may transmit an RR-SCI (e.g., a beamformed RR-SCI) using a Tx beam that is directed towards a target Rx UE, but the RR-SCI may not be detected by other Tx and/or Rx UEs included in the star topology. A second Tx UE in the direction of an Rx beam of the target Rx UE may transmit in the direction of the target Rx UE and using a same sidelink resource as the first Tx UE. The second Tx UE may transmit in the direction of the target Rx UE because the second Tx UE may not have detected the RR-SCI transmitted by the first Tx UE.

Figure 9:
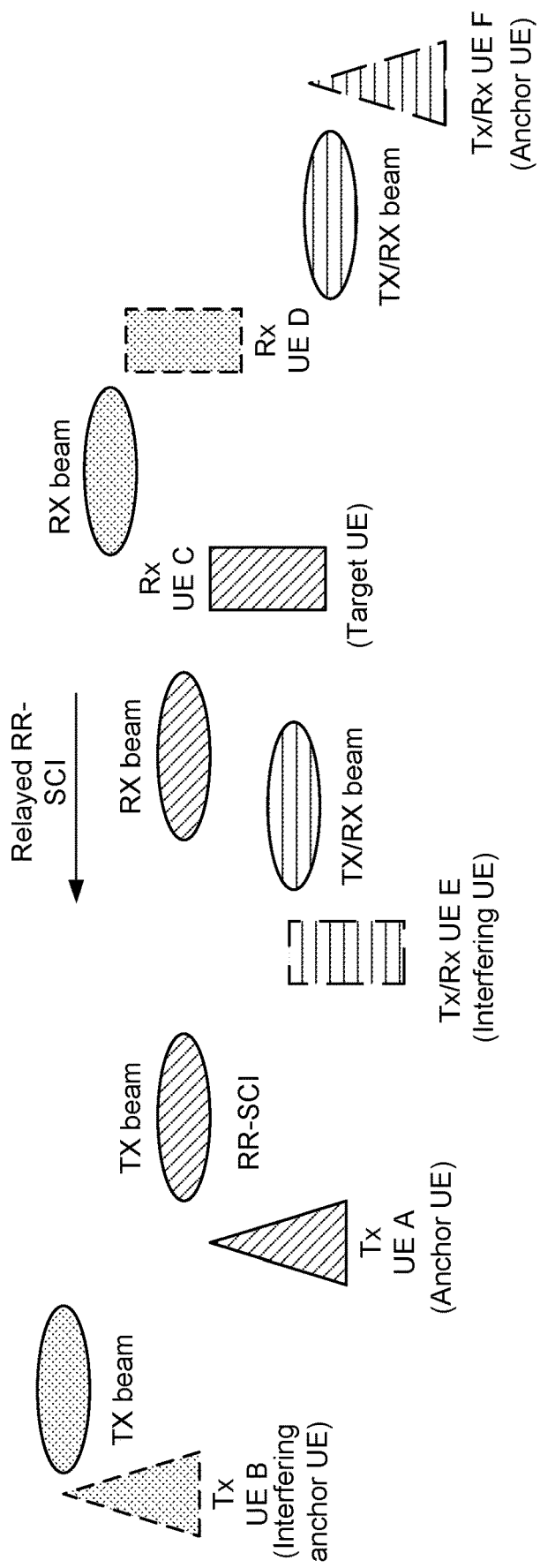

FIG. 9 is a diagram illustrating an example 900 of sidelink control signaling with Tx beam indications, in accordance with the present disclosure.

As shown in FIG. 9, Tx UE A may communicate with Rx UE C. Tx UE A may be an anchor UE and Rx UE C may be a target UE. Tx UE B may communicate with Rx UE D. Tx UE B may be an anchor UE, and in this example, Tx UE B may be an interfering anchor node. Tx/Rx UE E may communicate with Tx/Rx UE F. Tx/Rx UE F may be an anchor UE, and in this example, Tx/Rx UE E may be an interfering UE.

As an example, Tx UE A may transmit an RR-SCI. The RR-SCI may be detected by Rx UE C, Rx UE D, and/or Tx/Rx UE F. However, the RR-SCI may not be detectable by Tx UE B because Tx UE A may transmit the RR-SCI in a direction that is opposite to a direction of Tx UE B. Tx UE B, without detecting the RR-SCI transmitted by Rx UE A, may possibly transmit data to Rx UE D using a sidelink resource of Tx UE A. Further, Tx/Rx UE E may be configured to listen for RR-SCIs in the direction of Tx/Rx UE F, and Tx/Rx UE E may not detect the RR-SCI transmitted by Tx UE A. As a result, a reverse link transmission from Tx/Rx UE E to Tx/Rx UE F may interfere with a reception at Rx UE C.

In some aspects, an Rx UE that receives an RR-SCI from a Tx UE may relay or forward the RR-SCI in a direction of the Rx beam used to receive the RR-SCI.

In the example shown in FIG. 9, Rx UE C may receive the RR-SCI transmitted by Tx UE A, and Rx UE C may relay the RR-SCI in the direction of the Rx beam used by Rx UE C. As a result, Tx UE B may receive the relayed RR-SCI from Rx UE C. Tx UE B may determine a sidelink resource of Tx UE A based at least in part on the relayed RR-SCI received from Rx UE C.

In the other example shown in FIG. 9, Tx/Rx UE F may receive the RR-SCI transmitted by Tx UE A, and Tx/Rx UE F may relay the RR-SCI in the direction of the Rx beam used by Tx/Rx UE F. As a result, Tx/Rx UE E may receive the relayed RR-SCI from Tx/Rx UE F. Tx/Rx UE E may determine a sidelink resource of Tx UE A based at least in part on the relayed RR-SCI received from Tx/Rx UE F.

As indicated above, FIG. 9 is provided as an example. Other examples may differ from what is described with respect to FIG. 9.

Figure 10:
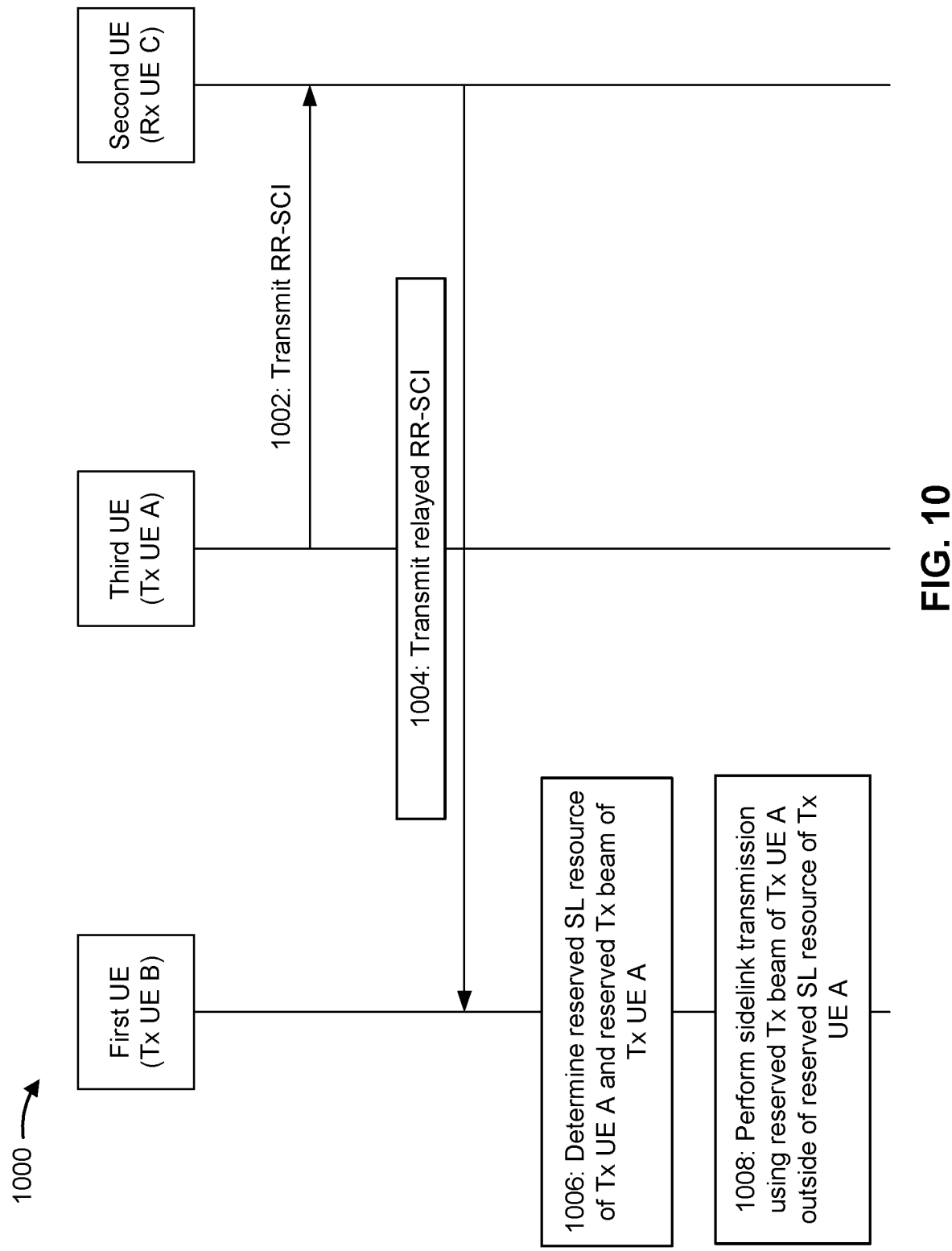

FIG. 10 is a diagram illustrating an example 1000 of sidelink control signaling with transmit beam indications, in accordance with the present disclosure. As shown in FIG. 10, example 1000 includes communication between a first UE (e.g., UE 120a), a second UE (e.g., UE 120e), and a third UE (e.g., UE 120f). In some aspects, the first UE, the second UE, and the third UE may be included in a wireless network such as wireless network 100. The first UE, the second UE, and the third UE may communicate on a wireless sidelink.

As shown by reference number 1002, the third UE (Tx UE A of FIG. 9) may transmit an RR-SCI to the second UE (Rx UE C of FIG. 9). The second UE may receive the RR-SCI using an Rx beam of the second UE.

As shown by reference number 1004, the second UE may relay the RR-SCI in a direction of the Rx beam of the second UE. In other words, the second UE may transmit a relayed RR-SCI in the direction of the Rx beam of the second UE. The relayed RR-SCI may be received by the first UE (Tx UE B of FIG. 9). The first UE may receive the relayed RR-SCI from the second UE when a direction of the second UE corresponds to a direction of an Rx beam of the first UE.

In some cases, the third UE may transmit the RR-SCI, but the first UE may be unable to detect the RR-SCI transmitted by the third UE. For example, the third UE may transmit the RR-SCI in a first direction, and the first UE may be in a second direction of the third UE that is opposite to the first direction. In this example, the first UE may receive the relayed RR-SCI from the second UE when the first UE is unable to receive the RR-SCI directly from the third UE.

As shown by reference number 1006, the first UE may determine, based at least in part on the relayed RR-SCI, a sidelink resource of the third UE. The first UE may determine, based at least in part on the relayed RR-SCI, a Tx beam of the third UE.

As shown by reference number 1008, the first UE may perform a sidelink transmission on the sidelink resource of the third UE when a Tx beam of the first UE does not spatially overlap with the Tx beam of the third UE. Alternatively, the first UE may perform a sidelink transmission outside of the sidelink resource of the third UE when the Tx beam of the first UE spatially overlaps with the Tx beam of the third UE.

As indicated above, FIG. 10 is provided as an example. Other examples may differ from what is described with respect to FIG. 10.

Figure 11:
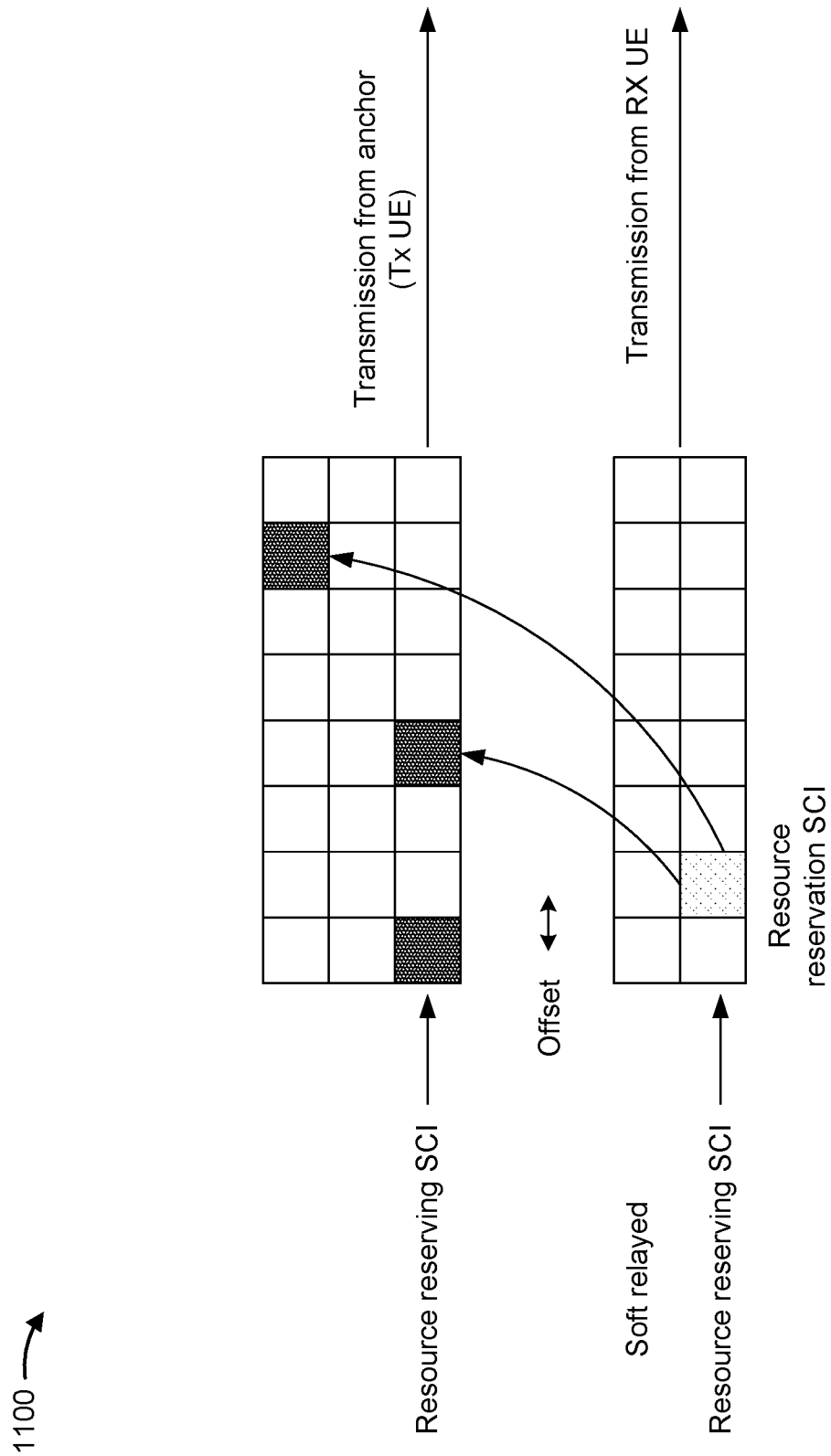

FIG. 11 is a diagram illustrating an example 1100 of sidelink control signaling with transmit beam indications, in accordance with the present disclosure.

As shown in FIG. 11, an RR-SCI may be transmitted on a sidelink resource from a Tx UE (e.g., Tx UE A of FIG. 10). A relayed RR-SCI may be transmitted on a sidelink resource from an Rx UE (e.g., Rx UE C of FIG. 10). The transmission of the RR-SCI and the transmission of the relayed RR-SCI may be separated by an offset. The relayed RR-SCI may indicate one or more sidelink resources associated with the Tx UE. For example, the relayed RR-SCI may indicate two separate sidelink resources associated with the Tx UE.

In some aspects, the Rx UE, after receiving the RR-SCI from the Tx UE, may relay the RR-SCI (i.e., transmit a relayed RR-SCI) in a direction of an Rx beam associated with the Rx UE. The relayed RR-SCI may include an SCI-1 carrying a reservation periodicity. The relayed RR-SCI may include an SCI-2 with a relayed resource reservation. The SCI-2 may include an identifier associated with the Tx UE. The SCI-2 may include a slot offset between the RR-SCI and the relayed RR-SCI, where the relayed RR-SCI may be transmitted later in time as compared to the RR-SCI. The slot offset may accommodate a scheduling delay of the Rx UE. The SCI-2 may be transmitted in a shortened PSSCH when no data is transmitted along with the SCI-2.

In some aspects, a plurality of Rx UEs may decode the relayed RR-SCI to determine a sidelink resource and/or a Tx beam associated with a Tx UE. The sidelink resource may be later in time as compared to the relayed RR-SCI. For example, a Tx UE may reserve sidelink resources after n+x slots, where an RR-SCI may be transmitted at slot n and a maximum scheduling delay of the relayed RR-SCI may be x, where n and x are positive integers. In some aspects, a slot offset between the relayed RR-SCI and the sidelink resources associated with the relayed RR-SCI may allow sufficient time for the relayed RR-SCI to be received and decoded at other UEs.

As indicated above, FIG. 11 is provided as an example. Other examples may differ from what is described with respect to FIG. 11.

Figure 12:
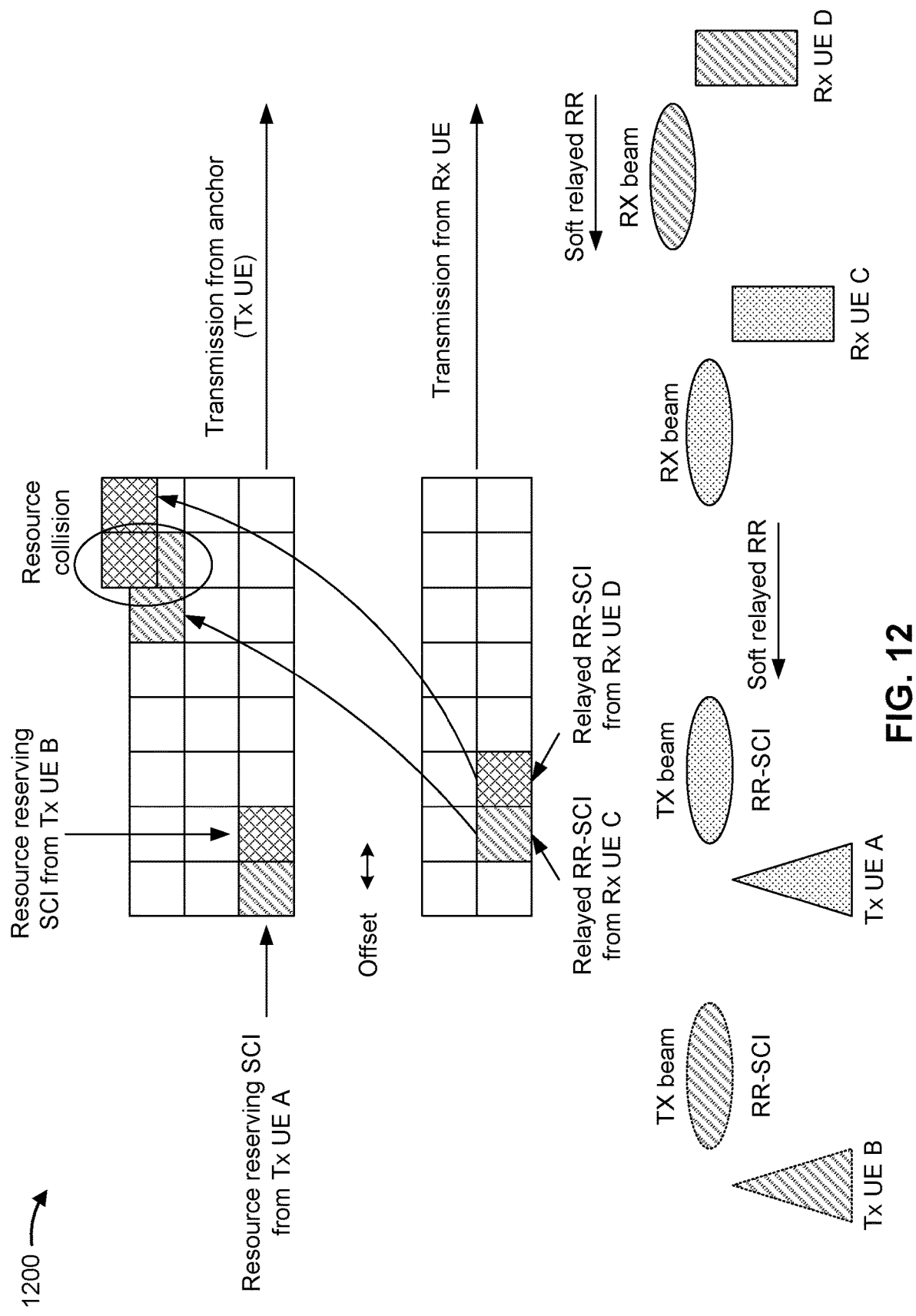

FIG. 12 is a diagram illustrating an example 1200 of sidelink control signaling with transmit beam indications, in accordance with the present disclosure.

As shown in FIG. 12, Tx UE A may transmit a first RR-SCI on a first sidelink resource. The first RR-SCI may indicate one or more sidelink resources associated with Tx UE A. Tx UE B may transmit a second RR-SCI on a second sidelink resource. The second RR-SCI may indicate one or more sidelink resources associated with Tx UE B. Tx UE B may transmit the second RR-SCI later in time as compared to the first RR-SCI transmitted by Tx UE A.

In some aspects, Rx UE C may receive the first RR-SCI from Tx UE A. Rx UE C may relay the first RR-SCI in a direction of an Rx beam of Rx UE C. The relayed first RR-SCI may indicate the one or more sidelink resources associated with Tx UE A. Rx UE D may receive the second RR-SCI from Tx UE B. Rx UE D may relay the second RR-SCI in a direction of an Rx beam of Rx UE D. The relayed second RR-SCI may indicate the one or more sidelink resources associated with Tx UE B. Rx UE D may transmit second relayed RR-SCI later in time as compared to first relayed RR-SCI transmitted by Rx UE C.

In some aspects, scheduling delays associated with relayed RR-SCI transmissions may allow other Tx UEs to transmit RR-SCIs, which may potentially lead to collisions in the sidelink resources.

In the example shown in FIG. 12, the one or more sidelink resources associated with Tx UE A may coincide with the one or more sidelink resources associated with Tx UE B. For example, Tx UE B may transmit its own RR-SCI before receiving the relayed RR-SCI associated with Tx UE A.

In some aspects, a Tx UE (e.g., Tx UE B) may cancel an overlapping resource when a relayed RR-SCI received at the Tx UE (e.g., from Rx UE C) indicates that a previous RR-SCI (e.g., transmitted by Tx UE A) has already occupied at least a portion of the sidelink resource. The previous RR-SCI may have been transmitted earlier in time as compared to an RR-SCI transmitted by the Tx UE. The previous RR-SCI may have sidelink resources which later conflict with the RR-SCI transmitted by the Tx UE. Based at least in part on the relayed RR-SCI indicating the previous RR-SCI, the Tx UE may determine to not use the overlapping sidelink resource for a data transmission from the Tx UE. A decoding delay of the relayed RR-SCI may correspond to a latest time when the Tx UE may determine to not use the overlapping sidelink resource.

As indicated above, FIG. 12 is provided as an example. Other examples may differ from what is described with respect to FIG. 12.

Figure 13:
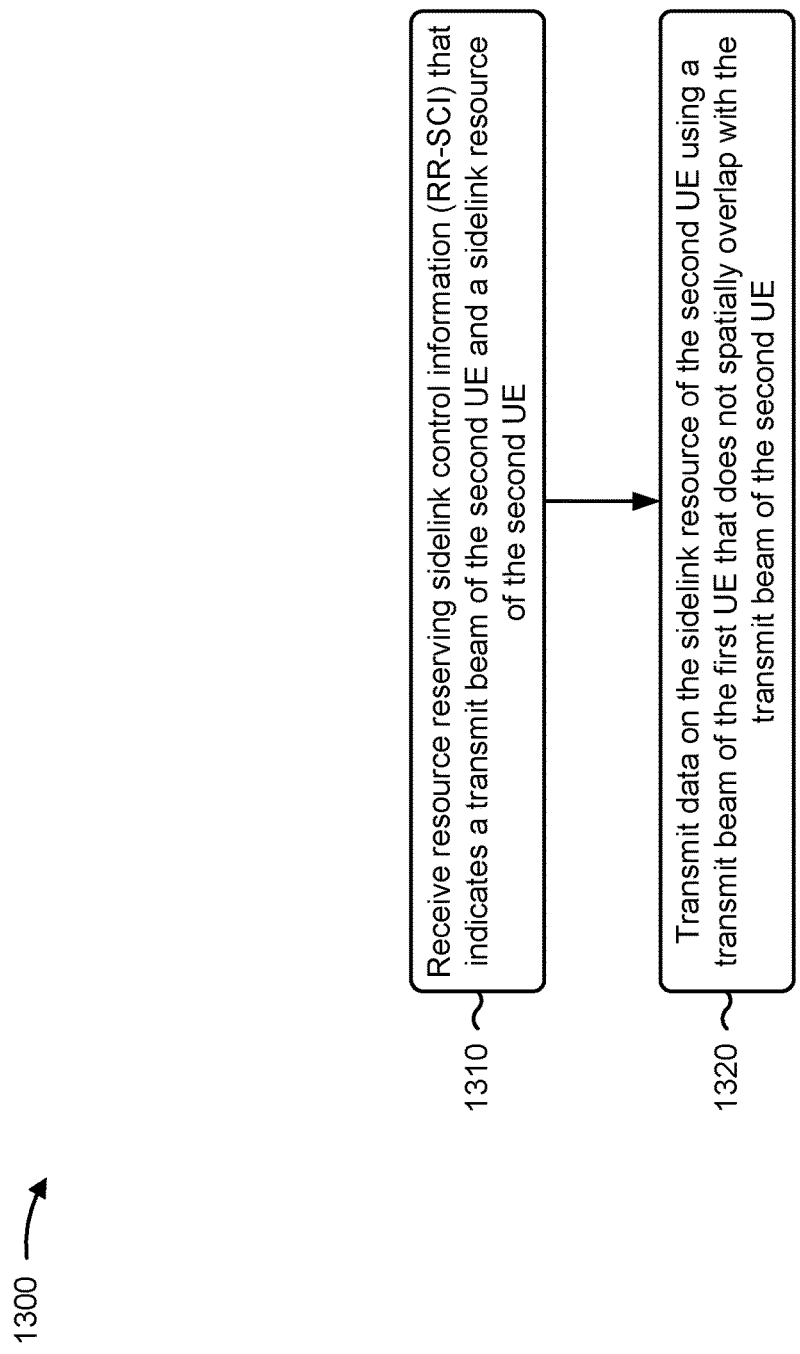
FIGS. 13-14 are diagrams illustrating example processes associated with sidelink control signaling with transmit beam indications, in accordance with the present disclosure.

FIG. 13 is a diagram illustrating an example process 1300 performed, for example, by a first UE, in accordance with the present disclosure. Example process 1300 is an example where the first UE (e.g., UE 120) performs operations associated with sidelink control signaling with transmit beam indications.

As shown in FIG. 13, in some aspects, process 1300 may include receiving, from a second UE, resource reserving sidelink control information (RR-SCI) that indicates a transmit beam of the second UE, and a sidelink resource of the second UE (block 1310). For example, the first UE (e.g., using antenna 252, demodulator 254, MIMO detector 256, receive processor 258, controller/processor 280, and/or memory 282) may receive, from a second UE, resource reserving sidelink control information (RR-SCI) that indicates a transmit beam of the second UE, and a sidelink resource of the second UE, as described above.

In some aspects, the first UE may correspond to Tx UE B of FIG. 6, and the second UE may correspond to Tx UE A of FIG. 6.

As further shown in FIG. 13, in some aspects, process 1300 may include transmitting data on the sidelink resource of the second UE using a transmit beam of the first UE that does not spatially overlap with the transmit beam of the second UE (block 1320). For example, the first UE (e.g., using antenna 252, transmit processor 264, TX MIMO processor 266, modulator 254, controller/processor 280, and/or memory 282) may transmit data on the sidelink resource of the second UE using a transmit beam of the first UE that does not spatially overlap with the transmit beam of the second UE, as described above.

Process 1300 may include additional aspects, such as any single aspect or any combination of aspects described below and/or in connection with one or more other processes described elsewhere herein.

In a first aspect, the RR-SCI includes an identifier associated with the second UE.

In a second aspect, alone or in combination with the first aspect, process 1300 includes interpreting the RR-SCI based at least in part on a periodic sidelink synchronization signal block (S-SSB) received at the first UE.

In a third aspect, alone or in combination with one or more of the first and second aspects, receiving the RR-SCI comprises receiving the RR-SCI from the second UE based at least in part on a sweep of a sidelink shared channel performed at the first UE.

In a fourth aspect, alone or in combination with one or more of the first through third aspects, process 1300 includes determining that the sidelink resource of the second UE is unavailable when information about the transmit beam of the second UE is unavailable at the first UE.

In a fifth aspect, alone or in combination with one or more of the first through fourth aspects, the transmit beam of the second UE is a first transmit beam of the second UE, and the RR-SCI indicates a second transmit beam of the second UE, and the first transmit beam of the second UE is associated with a first direction and the second transmit beam of the second UE is associated with a second direction that is opposite to the first direction.

In a sixth aspect, alone or in combination with one or more of the first through fifth aspects, the RR-SCI is associated with a first carrier, and the RR-SCI includes a cross carrier resource reservation to indicate a resource reservation for sidelink resources associated with a second carrier.

In a seventh aspect, alone or in combination with one or more of the first through sixth aspects, the first carrier corresponds to a low band anchor carrier, and the second carrier corresponds to a high band secondary carrier.

In an eighth aspect, alone or in combination with one or more of the first through seventh aspects, the RR-SCI that includes the cross carrier resource reservation includes one or more of a transmit beam index associated with the second carrier, a carrier index associated with the second carrier, or a slot offset between the RR-SCI and a first transmission in the second carrier.

In a ninth aspect, alone or in combination with one or more of the first through eighth aspects, the RR-SCI includes an SCI-1 carrying a reservation periodicity, and the RR-SCI includes an SCI-2 with the cross carrier resource reservation.

In a tenth aspect, alone or in combination with one or more of the first through ninth aspects, the SCI-2 with the cross carrier resource reservation is received over a shortened sidelink shared channel.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
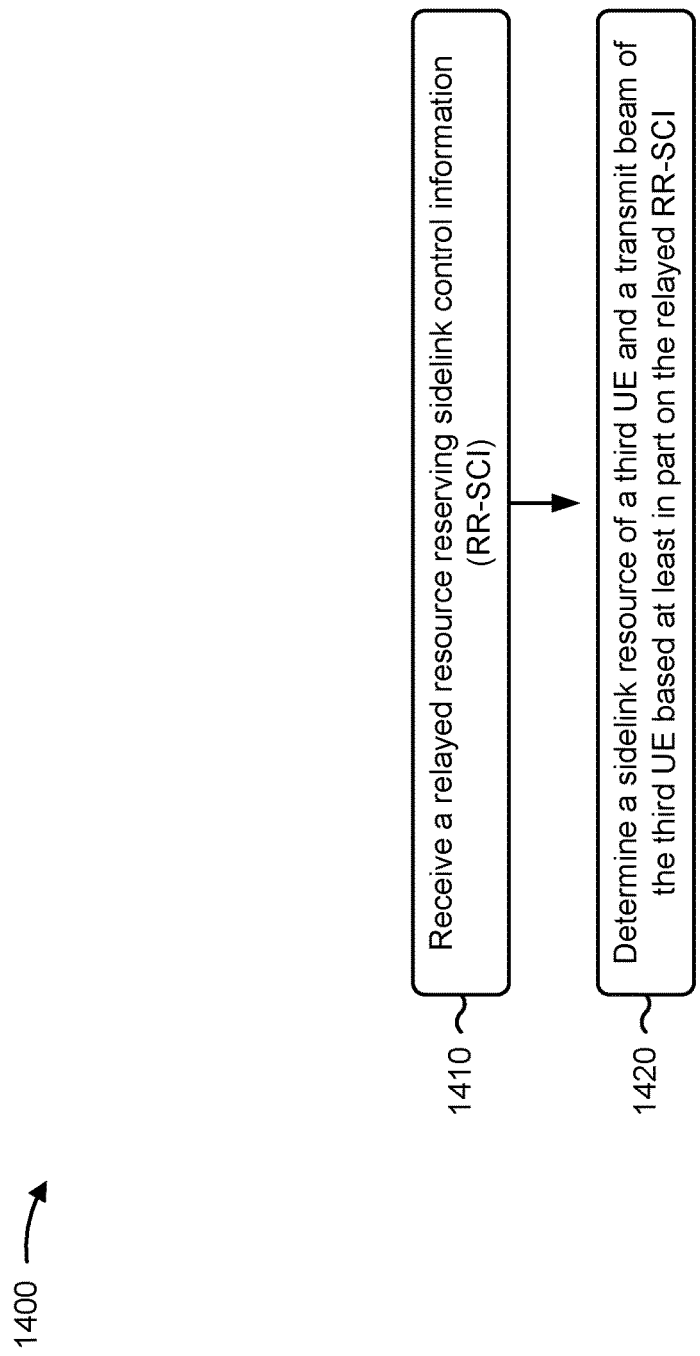

FIG. 14 is a diagram illustrating an example process 1400 performed, for example, by a first UE, in accordance with the present disclosure. Example process 1400 is an example where the first UE (e.g., UE 120) performs operations associated with sidelink control signaling with transmit beam indications.

As shown in FIG. 14, in some aspects, process 1400 may include receiving, from a second UE, a relayed resource reserving sidelink control information (RR-SCI) (block 1410). For example, the first UE (e.g., using antenna 252, demodulator 254, MIMO detector 256, receive processor 258, controller/processor 280, and/or memory 282) may receive, from a second UE, a relayed resource reserving sidelink control information (RR-SCI), as described above.

As further shown in FIG. 14, in some aspects, process 1400 may include determining a sidelink resource of a third UE and a transmit beam of the third UE based at least in part on the relayed RR-SCI (block 1420). For example, the first UE (e.g., using antenna 252, demodulator 254, MIMO detector 256, receive processor 258, transmit processor 264, TX MIMO processor 266, modulator 254, controller/processor 280, and/or memory 282) may determine a sidelink resource of a third UE and a transmit beam of the third UE based at least in part on the relayed RR-SCI, as described above.

In some aspects, the first UE may correspond to Tx UE B of FIG. 10, the second UE may correspond to Tx UE C of FIG. 10, and the third UE may correspond to Tx UE A of FIG. 10.

Process 1400 may include additional aspects, such as any single aspect or any combination of aspects described below and/or in connection with one or more other processes described elsewhere herein.

In a first aspect, receiving the relayed RR-SCI comprises receiving the relayed RR-SCI when a direction of the second UE corresponds to a direction of a receive beam of the first UE.

In a second aspect, alone or in combination with the first aspect, receiving the RR-SCI comprises receiving the relayed RR-SCI from the second UE when the first UE is unable to receive an RR-SCI associated with the relayed RR-SCI directly from the third UE.

In a third aspect, alone or in combination with one or more of the first and second aspects, the relayed RR-SCI includes an identifier associated with the third UE, and a slot offset between an RR-SCI and the relayed RR-SCI which occurs later in time as compared to the RR-SCI.

In a fourth aspect, alone or in combination with one or more of the first through third aspects, the RR-SCI includes an SCI-2 that indicates the sidelink resource of the third UE and the transmit beam of the third UE.

In a fifth aspect, alone or in combination with one or more of the first through fourth aspects, the sidelink resource of the third UE is associated with an anchor carrier.

In a sixth aspect, alone or in combination with one or more of the first through fifth aspects, the sidelink resource of the third UE is later in time as compared to the relayed RR-SCI.

In a seventh aspect, alone or in combination with one or more of the first through sixth aspects, process 1400 includes transmitting an RR-SCI that indicates a sidelink resource for the first UE, determining that the sidelink resource of the third UE, as indicated in the relayed RR-SCI, conflicts with the sidelink resource for the first UE based at least in part on an indicator included in the relayed RR-SCI, and determining to not transmit data on the sidelink resource for the first UE that conflicts with the sidelink resource for the first UE.

In an eighth aspect, alone or in combination with one or more of the first through seventh aspects, the relayed RR-SCI is received later in time as compared to the RR-SCI transmitted from the first UE by a defined offset.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The following provides an overview of some Aspects of the present disclosure:

Aspect 1: A method of wireless communication performed by a first user equipment (UE), comprising: receiving, from a second UE, resource reserving sidelink control information (RR-SCI) that indicates a transmit beam of the second UE, and a sidelink resource of the second UE; and transmitting data on the sidelink resource of the second UE using a transmit beam of the first UE that does not spatially overlap with the transmit beam of the second UE.

Aspect 2: The method of Aspect 1, wherein the RR-SCI includes an identifier associated with the second UE, and wherein the transmit beam indicated in the RR-SCI is different than a beam transmitting the RR-SCI.

Aspect 3: The method of any of Aspects 1 through 2, further comprising: interpreting the RR-SCI based at least in part on a periodic sidelink synchronization signal block (S-SSB) received at the first UE.

Aspect 4: The method of any of Aspects 1 through 3, wherein receiving the RR-SCI comprises: receiving the RR-SCI from the second UE based at least in part on a sweep of a sidelink shared channel performed at the first UE.

Aspect 5: The method of any of Aspects 1 through 4, further comprising: determining that the sidelink resource of the second UE is unavailable when information about the transmit beam of the second UE is unavailable at the first UE.

Aspect 6: The method of any of Aspects 1 through 5, wherein the transmit beam of the second UE is a first transmit beam of the second UE, wherein the RR-SCI indicates a second transmit beam of the second UE, and wherein the first transmit beam of the second UE is associated with a first direction and the second transmit beam of the second UE is associated with a second direction that is opposite to the first direction.

Aspect 7: The method of any of Aspects 1 through 6, wherein the RR-SCI is associated with a first carrier, and the RR-SCI includes a cross carrier resource reservation to indicate a resource reservation for sidelink resources associated with a second carrier.

Aspect 8: The method of Aspect 7, wherein the first carrier corresponds to a low band anchor carrier, and the second carrier corresponds to a high band secondary carrier.

Aspect 9: The method of Aspect 7, wherein the RR-SCI that includes the cross carrier resource reservation includes one or more of: a transmit beam index associated with the second carrier, a carrier index associated with the second carrier, or a slot offset between the RR-SCI and a first transmission in the second carrier.

Aspect 10: The method of Aspect 7, wherein the RR-SCI includes an SCI-1 carrying a reservation periodicity, and the RR-SCI includes an SCI-2 with the cross carrier resource reservation.

Aspect 11: The method of Aspect 10, wherein the SCI-2 with the cross carrier resource reservation is received over a shortened sidelink shared channel.

Aspect 12: A method of wireless communication performed by a first user equipment (UE), comprising: receiving, from a second UE, a relayed resource reserving sidelink control information (RR-SCI); and determining a sidelink resource of a third UE and a transmit beam of the third UE based at least in part on the relayed RR-SCI.

Aspect 13: The method of Aspect 12, wherein receiving the relayed RR-SCI comprises: receiving the relayed RR-SCI when a direction of the second UE corresponds to a direction of a receive beam of the first UE.

Aspect 14: The method of any of Aspects 12 through 13, wherein receiving the RR-SCI comprises: receiving the relayed RR-SCI from the second UE when the first UE is unable to receive an RR-SCI associated with the relayed RR-SCI directly from the third UE.

Aspect 15: The method of any of Aspects 12 through 14, wherein the relayed RR-SCI includes: an identifier associated with the third UE; and a slot offset between an RR-SCI and the relayed RR-SCI which occurs later in time as compared to the RR-SCI.

Aspect 16: The method of Aspect 15, wherein the RR-SCI includes an SCI-2 that indicates the sidelink resource of the third UE and the transmit beam of the third UE.

Aspect 17: The method of any of Aspects 12 through 16, wherein the sidelink resource of the third UE is associated with an anchor carrier.

Aspect 18: The method of any of Aspects 12 through 17, wherein the sidelink resource of the third UE is later in time as compared to the relayed RR-SCI.

Aspect 19: The method of Aspect 18, further comprising: transmitting an RR-SCI that indicates a sidelink resource for the first UE; determining that the sidelink resource of the third UE, as indicated in the relayed RR-SCI, conflicts with the sidelink resource for the first UE based at least in part on an indicator included in the relayed RR-SCI; and determining to not transmit data on the sidelink resource for the first UE that conflicts with the sidelink resource for the first UE.

Aspect 20: The method of Aspect 19, wherein the relayed RR-SCI is received later in time as compared to the RR-SCI transmitted from the first UE by a defined offset.

Aspect 21: An apparatus for wireless communication at a device, comprising a processor; memory coupled with the processor; and instructions stored in the memory and executable by the processor to cause the apparatus to perform the method of one or more of Aspects 1-11.

Aspect 22: A device for wireless communication, comprising a memory and one or more processors coupled to the memory, the one or more processors configured to perform the method of one or more of Aspects 1-11.

Aspect 23: An apparatus for wireless communication, comprising at least one means for performing the method of one or more of Aspects 1-11.

Aspect 24: A non-transitory computer-readable medium storing code for wireless communication, the code comprising instructions executable by a processor to perform the method of one or more of Aspects 1-11.

Aspect 25: A non-transitory computer-readable medium storing a set of instructions for wireless communication, the set of instructions comprising one or more instructions that, when executed by one or more processors of a device, cause the device to perform the method of one or more of Aspects 1-11.

Aspect 26: An apparatus for wireless communication at a device, comprising a processor; memory coupled with the processor; and instructions stored in the memory and executable by the processor to cause the apparatus to perform the method of one or more of Aspects 12-20.

Aspect 27: A device for wireless communication, comprising a memory and one or more processors coupled to the memory, the one or more processors configured to perform the method of one or more of Aspects 12-20.

Aspect 28: An apparatus for wireless communication, comprising at least one means for performing the method of one or more of Aspects 12-20.

Aspect 29: A non-transitory computer-readable medium storing code for wireless communication, the code comprising instructions executable by a processor to perform the method of one or more of Aspects 12-20.

Aspect 30: A non-transitory computer-readable medium storing a set of instructions for wireless communication, the set of instructions comprising one or more instructions that, when executed by one or more processors of a device, cause the device to perform the method of one or more of Aspects 12-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, configured to:
      receive, from a second UE, resource reserving sidelink control information (RR-SCI) that indicates a transmit beam of the second UE, and a sidelink resource of the second UE, wherein the RR-SCI is associated with a first carrier, and the RR-SCI includes a cross carrier resource reservation to indicate a resource reservation for sidelink resources associated with a second carrier; and
      transmit data on the sidelink resource, on the second carrier, of the second UE using a transmit beam of the first UE that does not spatially overlap with the transmit beam of the second UE.

2. The first UE of claim 1, wherein the one or more processors, when receiving the RR-SCI, are configured to: receive the RR-SCI from the second UE on the first carrier.

3. The first UE of claim 1, wherein the transmit beam of the second UE is a first transmit beam of the second UE, wherein the RR-SCI indicates a second transmit beam of the second UE, and wherein the first transmit beam of the second UE is associated with a first direction and the second transmit beam of the second UE is associated with a second direction that is opposite to the first direction.

4. The first UE of claim 1, wherein the first carrier corresponds to a low band anchor carrier, and the second carrier corresponds to a high band secondary carrier.

5. The first UE of claim 1, wherein the RR-SCI that includes the cross carrier resource reservation includes one or more of: a transmit beam index associated with the second carrier, a carrier index associated with the second carrier, or a slot offset between the RR-SCI and a first transmission in the second carrier.

6. The first UE of claim 1, wherein the RR-SCI includes an SCI-1 carrying a reservation periodicity, and the RR-SCI includes an SCI-2 with the cross carrier resource reservation.

7. The first UE of claim 6, wherein the SCI-1 comprises an indication of one or more resources for retransmission.

8. The first UE of claim 6, wherein the SCI-1 is omni-directional.

9. A method of wireless communication at a first user equipment (UE), comprising:
   receiving, from a second UE, resource reserving sidelink control information (RR-SCI) that indicates a transmit beam of the second UE, and a sidelink resource of the second UE, wherein the RR-SCI is associated with a first carrier, and the RR-SCI includes a cross carrier resource reservation to indicate a resource reservation for sidelink resources associated with a second carrier; and
   transmitting data on the sidelink resource, on the second carrier, of the second UE using a transmit beam of the first UE that does not spatially overlap with the transmit beam of the second UE.

10. The method of claim 9, further comprising: receiving the RR-SCI from the second UE on the first carrier.

11. The method of claim 9, wherein the transmit beam of the second UE is a first transmit beam of the second UE, wherein the RR-SCI indicates a second transmit beam of the second UE, and wherein the first transmit beam of the second UE is associated with a first direction and the second transmit beam of the second UE is associated with a second direction that is opposite to the first direction.

12. The method of claim 9, wherein the first carrier corresponds to a low band anchor carrier, and the second carrier corresponds to a high band secondary carrier.

13. The method of claim 9, wherein the RR-SCI that includes the cross carrier resource reservation includes one or more of: a transmit beam index associated with the second carrier, a carrier index associated with the second carrier, or a slot offset between the RR-SCI and a first transmission in the second carrier.

14. The method of claim 9, wherein the RR-SCI includes an SCI-1 carrying a reservation periodicity, and the RR-SCI includes an SCI-2 with the cross carrier resource reservation.

15. The method of claim 14, wherein the SCI-1 comprises an indication of one or more resources for retransmission.

16. The method of claim 14, wherein the SCI-1 is omni-directional.

17. A first user equipment (UE) for wireless communication, comprising:
   one or more memories; and
   one or more processors, coupled to the one or more memories, configured to:
      transmit, to a second UE, resource reserving sidelink control information (RR-SCI) that indicates a transmit beam of the second UE, and a sidelink resource of the second UE, wherein the RR-SCI is associated with a first carrier, and the RR-SCI includes a cross carrier resource reservation to indicate a resource reservation for sidelink resources associated with a second carrier; and receive data on the sidelink resource, on the second carrier, of the second UE using a transmit beam of the first UE that does not spatially overlap with the transmit beam of the second UE.

18. The first UE of claim 17, wherein the one or more processors, when transmitting the RR-SCI, are configured to:

receive the RR-SCI from the second UE on the second carrier.

19. The first UE of claim 17, wherein the RR-SCI that includes the cross carrier resource reservation includes one or more of: a transmit beam index associated with the second carrier, a carrier index associated with the second carrier, or a slot offset between the RR-SCI and a first transmission in the second carrier.

20. The first UE of claim 17, wherein the RR-SCI includes an SCI-1 carrying a reservation periodicity, and the RR-SCI includes an SCI-2 with the cross carrier resource reservation.

* * * * *